Oct. 28, 1969  C. DONALDSON  3,475,264
REINFORCED PLASTIC STRAPPING LAMINATE
Filed July 21, 1964  3 Sheets-Sheet 1
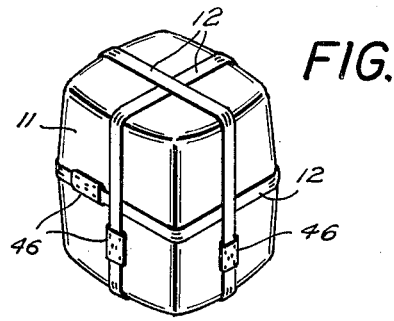
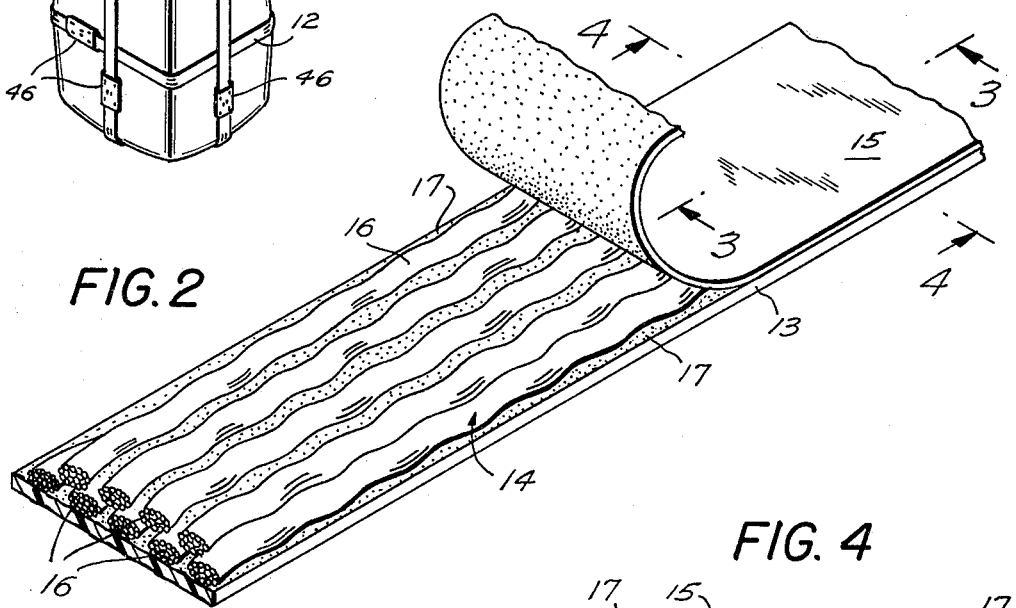
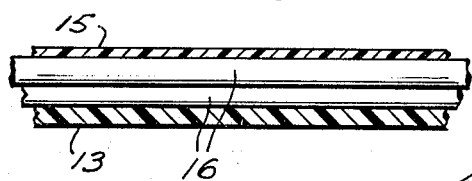
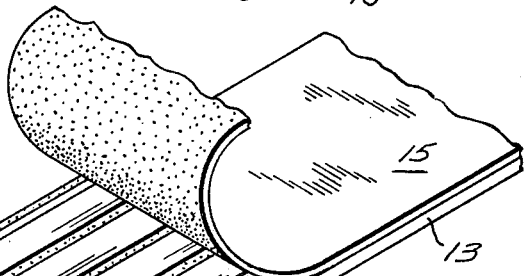
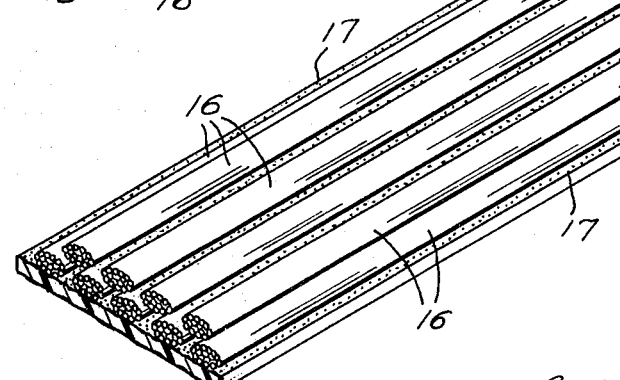
INVENTOR
CHASE DONALDSON
BY
Pennie, Edmonds, Morton, Taylor & Adams
ATTORNEYS

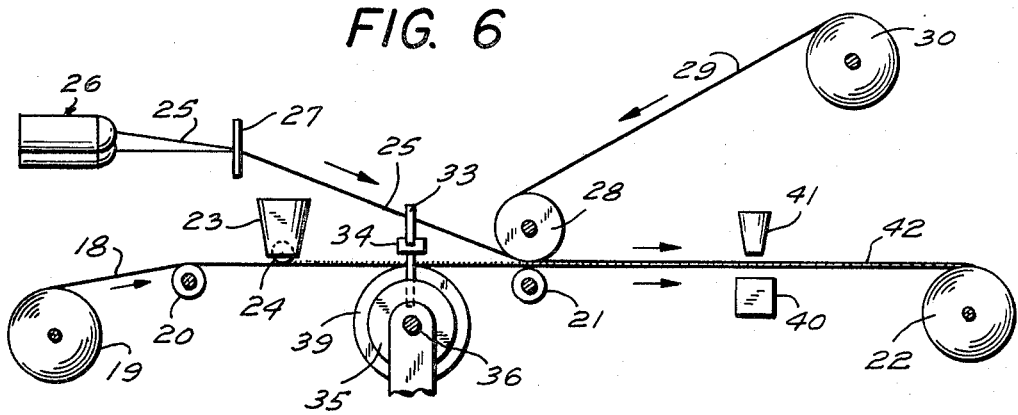

Oct. 28, 1969    C. DONALDSON    3,475,264
REINFORCED PLASTIC STRAPPING LAMINATE
Filed July 21, 1964    3 Sheets-Sheet 3
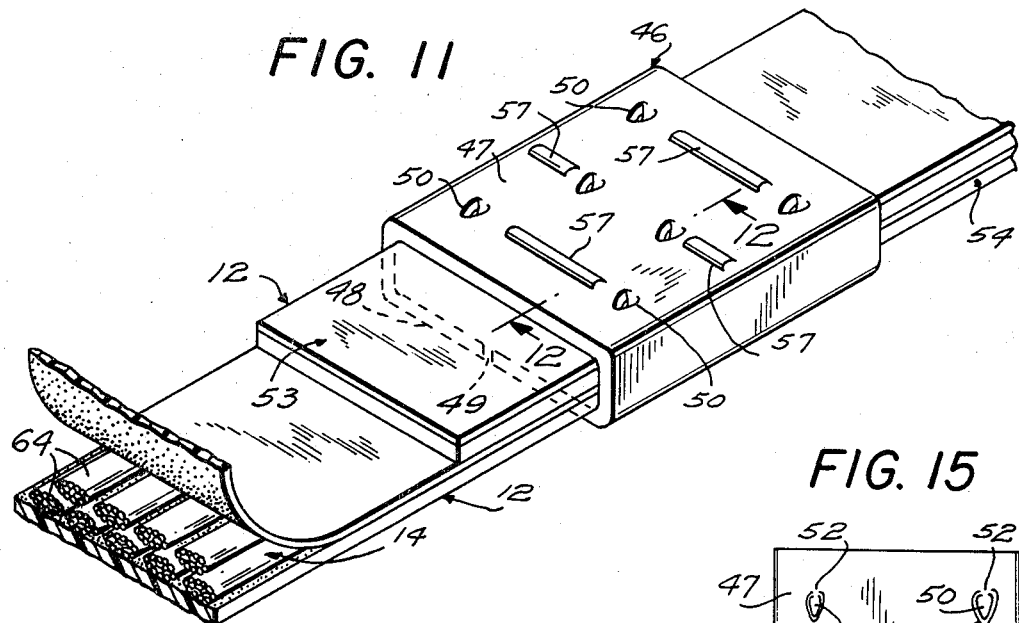
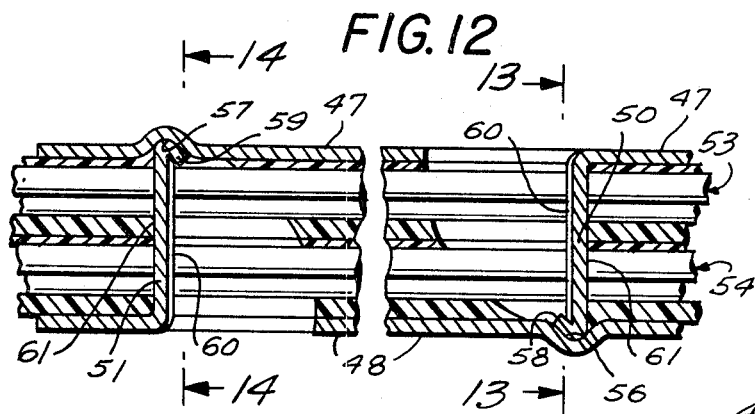
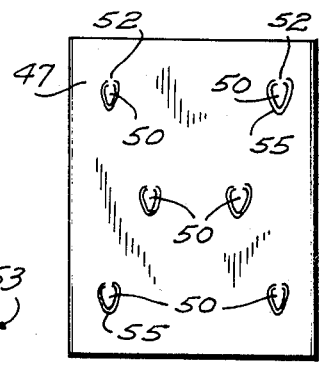
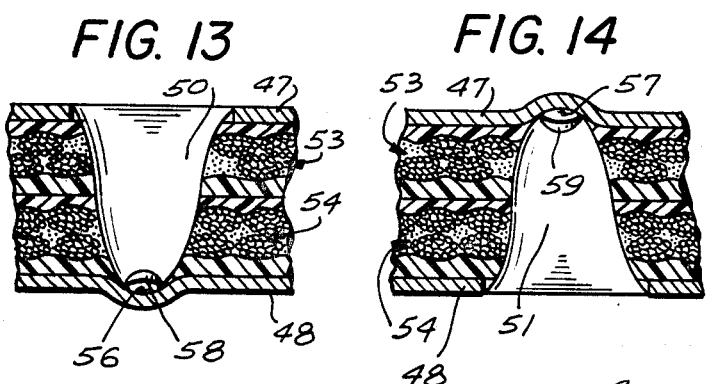
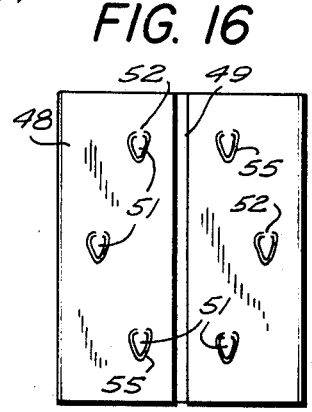
INVENTOR
CHASE DONALDSON
BY
Pennie, Edmonds, Morton, Taylor & Adams
ATTORNEY

United States Patent Office 3,475,264
Patented Oct. 28, 1969

3,475,264
REINFORCED PLASTIC STRAPPING LAMINATE
Chase Donaldson, 8 E. 83rd St.,
New York, N.Y. 10028
Filed July 21, 1964, Ser. No. 384,215
Int. Cl. B32b *3/14, 5/12;* D03d *11/00*
U.S. Cl. 161—143                    3 Claims

ABSTRACT OF THE DISCLOSURE

Strapping tape for application to packages and boxes of various sizes is made up of one or more layers of reinforcing fibrous material and one or more layers of plastic material which has limited elastic properties. The fibrous material may for example be glass fibers arranged as stringlike sinuous elements. The limited elasticity of the plastic material may correspond with the extensibility of the sinuous elements.

---

This invention relates to strapping, this term being the common designation of flat bands of material of high tensile strength for application to boxes, cartons, pallet loads, etc., for the purpose of reinforcement, or to restrain them from movement or shifting during transportation, for example, by railroad freight car or by highway truck. Strapping is usually applied with a tensioning tool and the overlapping ends sealed in place by a crimping tool, or otherwise. Pressure sensitive tape is not to be confused therewith as no seal is employed and little tension applied. More particularly, the invention relates to the provision of strapping made of reinforced plastic material, specifically plastic material composed of synthetic resin.

The materials heretofore most commonly used for strapping have been steel strip, or tapes of plastic material such as rayon, nylon or polypropylene. Strapping made from such materials has been objectionable for one reason or another. Steel, for example, possesses the requisite strength, but if the load to which it has been applied shrinks, compacts, crushes or shifts the strapping becomes loose because steel possesses no ability to retract and conform to the shrunken load. In addition, it is relatively heavy and is subject to rusting and attack by certain chemicals. Moreover the disposal of the used strapping presents a problem, and the use of the strapping involves some danger of physical injury. Strapping made of plastic materials such as those mentioned possesses the required elasticity to conform to a shrunken load, but is lacking in tensile strength, and also tends to "creep" or relax under high, sustained loads. Its cost is high compared to steel, and its use is limited. Strapping made of one particular plastic material, polypropylene, is objectionable from the sales standpoint because due to its highly oriented nature, it tends to split lengthwise when subjected to high loads.

The purposes or objects of the present invention are to provide a reinforced plastic strapping which will overcome to a large extent the objectionable features of the steel and plastic strapping previously mentioned; which has tensile strength equal to that of steel; which possesses elastic contracting properties equivalent to those of the presently available plastic strapping; and which can be applied to and secured to the load without difficulty.

In accordance with my present invention, the improved strapping comprises a laminated tape having a central layer of reinforcing fibrous material, and on each side thereof a layer of plastic material having limited elastic properties, the reinforcing material in the fibrous layer comprising a plurality of stringlike, or threadlike sinuous elements arranged side by side in approximately the same plane, and with the side layers adhering to each other and encasing or encapsulating the fibrous layer. To this end the plastic layers are somewhat wider than the fibrous layer and are secured together along their opposite margins. The materials of the side layers advantageously extend through the interstices of the central layer and are caused to mutually adhere to one another by means of ultrasonic welding, or otherwise, to provide a homogeneous laminate by welding of the plastic films or layers to the fibrous material and to one another. The top side layer is desirably about half the thickness of the bottom layer. It should be understood that where reference to top layer or bottom layer occurs these terms are interchangeable.

In the manufacture of the improved strapping an adhesive is employed to secure the fibrous material to one or the other of the plastic layers, usually the bottom layer, while the second plastic layer is being applied. The adhesive may be applied just prior to the application of the fibrous material, or the layer may be pre-coated in a separate operation. Also under proper circumstances an appropriate adhesive may be used to secure the second plastic layer to the fibrous layer and to secure the two layers together through the interstices of the fibrous layer and also along the margins of the two films.

Advantageously, the fibrous material comprises glass filaments spun into a glass fiber yarn, or employed as glass filaments, but in either case arranged in a sinuous or wavy, stringlike form or pattern, although it will be understood that other suitable fibers may be employed as long as they are provided in the sinuous or wavy pattern and have the necessary strength.

The plastic material employed comprises a synthetic resin having limited elastic properties, the following being examples of such resins, namely: Polypropylene stretch oriented to provide the desired degree of limited elasticity, polyethylene, and nylon.

By arranging the fibrous material, such as glass fiber, in a stringlike sinuous or wavy pattern this material, which is substantially unelastic, is given a limited degree of extensibility or elongation, and by employing a plastic material such as stretch oriented polypropylene the degree of elasticity of this material can be made to correspond to the extensibility of the sinuous fibrous material. This allows the strapping tape to elongate somewhat as it is applied to the load, the limit of elongation being the point at which the sinuous or wavy fibrous material straightens. Beyond this point the inelasticity of the fibrous material, such as glass fiber, renders the tape substantially inextensible as additional tension is applied. The limited elasticity of the plastic material however permits the limited extension of the tape until the fibers are straightened.

By employing fibrous material, advantageously glass fiber of appropriate size and number of "ends," or yarns, a strapping is produced which is comparable in tensile strength to that of steel strip of like cross-sectional dimensions. Its combination with the indicated plastic materials results in a unique and useful strapping material of the stated high tensile strength, yet having the ability to contract within predetermined limits (between 7½ and 10%) to conform to any decrease in the dimensions of the load itself, or to shifts in its location.

Advantageously the laminate strapping material is made up of a lower layer or film of stretch oriented polypropylene forming the base carrier for the glass fiber yarn. Alteratively this film may be used as the top layer of the strapping. The thickness of this base carrier is such as to provide the tensile strength required should the bundle or package shrink below the length of the straightened glass fiber yarn.

The upper layer or film of plastic which is applied over the glass fiber yarn is advantageously bi-axially oriented polypropylene having approximately equal strength in both directions. A cast film may also be used for this top layer or, alternatively may be used for the bottom layer. By providing a top layer or a bottom layer of this character, the tendency for the highly oriented polypropylene of the lower layer to split lengthwise is inhibited by reinforcing the material crosswise of the web. The layer of bi-axial oriented or cast polypropylene film can be of a lighter gauge than the stress oriented base layer, and may be 50%, or even 25%, of the thickness of the base layer of stretch oriented polypropylene.

With certain plastic materials such as nylon and polyethylene, adhesives of various types may be employed in forming the laminate such as, for example, latices of natural or artificial rubber, or other flexible types of plastic adhesives. However, polypropylene does not adhere well to itself even when an adhesive is employed and also does not respond to solvent welding. In making the strapping tape or laminate, I have found that ultrasonic welding unites satisfactorily the upper and lower plastic films to the glass fibers and to each other. Polypropylene after it has been stretch oriented cannot be heat sealed or welded in the conventional manner because uniform application of heat throughout the mass destroys the orientation of the molecules, but ultrasonic impulses heat only the contacting surfaces of the materials to be united and produce a bond or weld without affecting the orientation of the molecules and therefore without affecting the strength or elastic properties required.

The improved strapping material is so constructed that it can be readily and easily applied to the load, that is, to a bundle, package, etc., by the use either of a properly constructed mechanical clamp or seal for securing together the overlapping ends of the strapping, or these ends may be welded together by means of a conventional ultrasonic welding device.

The invention will be further described in connection with the accompanying drawings with illustrate the construction of the improved strapping material, the manner of connecting the overlapping ends thereof by a specially constructed clamp or seal, and the method of making the laminate.

In these drawings, all of which are diagrammatic and, in most instances, greatly enlarged;

FIG. 1 is a perspective view of a bundle or package to which the improved strapping material has been applied in three directions;

FIG. 2 is a perspective view of a portion of the strapping material or tape, from which the top layer or film has been partially removed to expose the interior of the tape and showing the wavy form of the glass fibers when not under tension;

FIG. 3 is a partial sectional view lengthwise of the tape as indicated by line 3—3 of FIG. 2;

FIG. 4 is a cross-sectional view of the tape taken on line 4—4 of FIG. 2;

FIG. 5 is a perspective view of similar to FIG. 2 showing the straightening of the glass fibers when under tension;

FIGS. 6 and 7 illustrate the method of making one form of the strapping material, FIG. 6 showing the arrangement of the apparatus in side elevation, and FIG. 7 showing the same in plan;

FIG. 8 is a view in section taken on line 8—8 of FIG. 7 in the direction of the arrows and drawn to an enlarged scale;

FIG. 9 is a similar section taken on line 9—9 of FIG. 7;

FIG. 10 illustrates a method of making a modified form of the strapping and shows in perspective a form of apparatus for carrying out this method;

FIG. 11 is a perspective view showing the overlapped ends of a strapping with a clamp or seal applied thereto;

FIG. 12 is a fragmentary vertical section taken on line 12—12 of FIG. 11;

FIG. 13 is a vertical section taken on line 13—13 of FIG. 12;

FIG. 14 is a vertical section taken on line 14—14 of FIG. 12 looking in the opposite direction;

FIG. 15 is a top view of a clamp before it is applied; and

FIG. 16 is a bottom view of the clamp shown in FIG. 15.

Referring to these drawings, there is shown in FIG. 1 a package or bundle 11 to which the strapping material or tape 12 has been applied in all three planes so that the bundle is completely strapped. In many cases the application of the strapping in a single plane, or at most in two planes is sufficient.

As shown in FIG. 2, the strapping material 12 comprises a bottom or base layer 13 of plastic material, an intermediate layer 14 of glass fibers and a top layer 15 also of plastic material. The top layer 15 advantageously is made considerably thinner than bottom layer 13. Base layer 13 is advantageously a film of stretch oriented polypropylene of the order of .007″ in thickness. As previously indicated the words "top" and "bottom" as applied to the layers are interchangeable.

The layer 14 of glass fibers is made up of a series or plurality of glass fiber "ends," or yarns 16 arranged in wavy or sinusoidal form as shown in FIG. 1, this being the relaxed or natural condition of the glass fiber yarns, and this sinusoidal condition permits the layer 14 to elongate when the tape is applied to a package or load. The top layer 15 of plastic material is also advantageously of polypropylene, but is of the type which has considerable tensile strength in the crosswise direction such as, for example, the cast or bi-axially oriented type. The thickness of this top layer is advantageously about .003″ to .005″, so that the thickness of the strap is slightly over .01″ to .014″, inasmuch as the glass fibers are flattened during the operation of combining the three layers. The above dimensions are typical for ½″ wide strapping and should be considered indicative rather than absolute. The dimensions will vary depending upon the width of the strapping and the strength and elasticity requirements of the end product.

The plastic layers 13 and 15 are somewhat wider than the glass fiber layer 14 and the two layers are caused to adhere to one another and also to the glass fiber layer 14. This is advantageously accomplished by ultrasonic welding, but a suitable adhesive may be used instead under proper circumstances. Ultrasonic welding causes the material of the bottom and top layers to melt at the surfaces of these layers and to penetrate through the fibers of the glass fiber layer 14 uniting the side layers to the central layer and to each other through the interstices of the central layer. When adhesive is employed the adhesive itself penetrates the glass fibers of the central layer and causes the top and bottom plastic layers to adhere to one another. In either case, the glass fiber yarns 16 are encased or encapsulated by the plastic material, particularly along the margins 17 of the tape beyond the edges of central layer 14 where the two layers of plastic material 13 and 15 are in direct contact with one another. Such encapsulation protects the glass fibers from moisture, from corrosive atmospheres or fluids and from abrasion on sharp edges.

When the strapping is applied to a package or a load and placed under tension, the sinusoidal or wavy glass fiber yarn 16 straightens out as shown in FIG. 5, the elasticity of the layers 13 and 15 being sufficient to permit such elongation of the glass fiber material, elongation mounting to from 5 to 10% in length. When tension is applied to the strapping greater than necessary to render the glass fiber yarns straight, the load is taken by these yarns up to the maximum for which the particular strapping has been designed, but there is no further elongation of the strapping.

Should the package or the load shrink or contract in its dimensions, or shift, the strapping will also contract to correspond with the extent of the shrinkage. When shrinkage occurs, the lengthwise stress in the strapping is reduced so that the glass fibers tend to return to their wavy or sinusoidal condition as shown in FIG. 2. When this point has been reached, should the package or load continue to shrink further, the strapping will continue to tightly engage the load inasmuch as the layers 13 and 15 of plastic material will continue to shrink and continue to grip or hug the load according to the tensile strength and contracting properties of the elastic material employed, such as, for example, polypropylene, nylon, or rayon.

Glass fiber yarns are known in the trade by various designations indicating weight, plies, twist etc., such as 37's G, 37's E, etc. A 37's yarn contains 3700 yards to the pound and has a cross-sectional diameter of .00037" per end and consists of approximately 820 individual glass filaments. When elongated or straightened as shown in FIG. 5, the glass fiber yarn is carrying the full load for which the strap is designed. For example, each end of 37's G yarn will carry a load of about 25 lbs. before rupturing, and if the strapping included 40 "ends" it would sustain a load of 1,000 lbs. per inch of width, the maximum that is normally required of steel strapping. Rated in p.s.i., glass fiber reinforced plastic strapping could be designed to carry 110,000 lbs. p.s.i. which is approximately equal to the rating of cold rolled steel strapping. Other types and weights of glass fiber yarns may of course be employed.

Referring now to FIGS. 6–10, inclusive, in making the improved strapping material a strip or layer 18 of plastic material such as polypropylene of a thickness suitable for forming the lower or base layer 13 of the strapping is fed from a supply roll 19 over supporting rollers 20 and 21 on to a takeup roll 22, appropriate means being provided for rotating such takeup roll at the proper rate. As the strip 18 moves forward its upper surface receives a layer of adhesive from an applicator 23 having a distributing roll 24 at the lower portion thereof for applying the adhesive. The strip may have the layer of adhesive pre-applied rather than applied during the manufacturing process in which event the applicator 23 is not used.

The desired number of "ends" or yarns 25 are supplied from a yarn creel 26 and are directed through apertures in a stationary eye board 27 (FIGS. 6 and 9) mounted at a suitable distance above the horizontal plane of the rollers 20 and 21 to direct the yarns 25 in suitably spaced relation and arrangement to the teeth 32 of a comb device 33, thence onto the adhesive coated upper surface of strip 18. A pressure roll 28 is mounted directly above supporting roller 21, and an upper strip 29 of plastic to form the top layer 15 of the strapping is fed from a supply roll 30 around the pressure roll 28 and into contact with the glass fiber yarns 25 and lower strip 18. Roll 28 and roller 21 are adjusted with respect to one another to cause the materials to be brought into close association with one another as previously described. It is again pointed out that strip 18 forming the lower or base layer 13 may be interchanged with the upper strip 29 forming the top layer 15.

In order to lay the glass fiber yarns 25 onto the surface of the lower strip or film 18 in a wavy or sinuous formation as previously described, yarns 25 are passed between the teeth 32 of a laterally reciprocating comb device 33 just prior to their delivery to the surface of strip 18 beneath the upper strip 29 and pressure roll 28.

Comb 33 is supported for lateral sliding movement in suitable supports 34 and reciprocating movement is imparted to it by means of any suitable mechanism. As shown by way of example in FIGS. 7 and 8 two similar face cam cylinders 35 are affixed to a continuously rotating shaft 36. Cam formations 37 are provided at the inner ends of cylinders 35 which co-act respectively with two vertically spaced rods 37 projecting downwardly from the lower side of comb 33. If desired strip 18 may be additionally supported by a cylinder 39 mounted on shaft 36 between cam members 35.

After the three layers 18, 25 and 29 have been compacted by the operation of rollers 28 and 21, they pass between an "anvil" 40 and a "head" 41 of an ultrasonic welding device. This device is properly adjusted with respect to the thickness of the web as well as the speed of travel of the web to heat the materials to the desired limited extent. Such heat melts the adjacent top and bottom polypropylene films 29 and 18, but only in the immediately adjacent areas, and causes a flow of the plastic into and around the fibers of the yarns 25. The device also produces a welding "bead" (not shown) along the path of the yarn. It also causes the margin 17 of the two films to adhere to one another so as to effect a seal along the edges of the layer 14 of the glass fiber yarns thereby encapsulating the fibrous material.

It will be understood that the finished tape 42 may be of any desirable or suitable width. That is to say, it may be made in a comparatively wide width, and subsequently cut into the widths desired for the strapping material, or tape 42 itself may be made in the desired strapping width.

The action of the ultrasonic welding device 40, 41 produces localized heating of the plastic and fibrous material which causes the plastic to melt, flow into and around the glass fiber filaments and hence weld the top and bottom strips or films 29 and 18 and the glass fibrous material into a homogeneous mass or laminate wherein the glass fibers are encapsulated in the plastic material.

It was previously pointed out that stretch oriented polypropylene cannot be heat sealed according to conventional methods because such heat application affects the orientation of the molecules and reduces the tensile strength so that the increased strength which has been built up by stretching is impaired or lost. It was also indicated that polypropylene cannot be solvent welded, and further that adhesives, in general, are not as effective in producing a bond of polypropylene to itself, or to other materials, as they are with thermoplastic materials.

Further, ultrasonic impulse welding results in the combination of the polypropylene films and glass fiber yarns into the desired end product, namely, a reinforced plastic strapping having high initial tensile strength, depending upon the content of glass fibers, having the elastic properties of stretch oriented polypropylene. These properties are not impaired by the ultrasonic operation as the heat source is localized at the interfaces between the two films, either by the presence of the glass fibers there, or by the additional pressure exerted at the edges of the strapping. The plastic itself serves as an insulator to prevent the induced heat from being transmitted into the body of the plastic to the detriment of the elastic and tensile strength properties of the plastic.

The use of a thinner top film which is 50% or even 25% of the thickness of the stretch oriented lower film, as the top ply of the laminate is of significance because this thinner film may be made of a less expensive material and, in addition, cause the induced heat to be localized at the interface between the two films rather then being transmitted to the lower film.

Referring now to FIG. 10 there is here illustrated a method and apparatus for making the strapping material in a different way from that previously described. Instead of applying "ends" or yarns of glass fibers to the lower strip, such as strip 18 of FIGS. 6 and 7, the individual glass filaments are applied to such strip. The method and apparatus as shown in FIGS. 6 and 7 and previously described are otherwise substantially the same. It will be understood therefore that FIG. 10 illustrates only the changes required at the left-hand portion of such apparatus. Thus, the lower strip 18 is fed from a supply roll 19 and over a supporting roll 20. Then there follows a plurality of furnaces 43 which are supported by a common carriage 44 of any appropriate construction.

From the bottom of each of the furnaces 43 there are discharged a plurality of individual glass filaments 45, which being at a high temperature adhere to the upper surface of the plastic strip 18 without the application of adhesive. The assembly of furnaces 43 being mounted upon a common support are simultaneously reciprocated laterally with respect to the advancing strip 18 by means of the rotating cam members 35a which co-act with pins or rods 38a projecting upwardly from the furnace assembly. Thus the filaments 45 are deposited in sinuous or wave-like form directly onto the surface of the strip 18.

It will be understood that the cam devices 35 and 35a are mere diagrammatic representations of one form of drive for imparting lateral movement to the glass fiber yarns, in one case, and, in the other, filaments, so as to lay them on the lower plastic strip in a sinuous or wavy form. Many other ways may be devised for imparting such lateral vibratory movement which it will be understood is to be coordinated with the speed of advance of the lower strip 18 from supply roll 19 to the take-up roll 22. At high linear speeds of the plastic strip or film 18, it is entirely possible that the employment of electromagnetic or electronic devices for producing such lateral movement might be used.

In FIG. 11-16 there is illustrated a device which has been developed especially to cooperate with the fibrous layer 14 in securing together the opposite ends of a length of plastic strapping tape. This device consists of a rectangular metal tube or connector 46 (FIG. 11). Such connector is formed from a flat piece of sheet metal of the appropriate dimensions and advantageously of sheet steel of comparatively light gauge but possessing the required stiffness.

While this sheet is in its flat state it is subjected to a stamping operation in a conventional press by means of which in the area of the sheet which is to form the upper or outer side 47 of connector 46, a series or plurality of tongues 50 are partially formed, and a second series or plurality of similar tongues 51 are partially formed in the areas of the sheet which will constitute the inner or lower wall 48. Each of these tongues is shaped like an arrowhead, having a portion 52 at one end which is narrower than the widest portion of the tongue. In partially forming these tongues 50 and 51, the outline of each, other than the portion 52, is partially cut through the tickness of the metal plate. Also the dies forming these tongues are so made as to produce a dished or concave shape on the outer surfaces of the tongues, and to give a convex shape to their inner surfaces, for purposes which will appear later on.

After this stamping operation partially forming the tongues 50 and 51, the metal plate is subjected to a further stamping operation or operations whereby the metal plate is folded to form the rectangular tube 46. The upper or outer side 47 and the lower side 48 are flat and parallel, but side 48 is discontinuous where the ends of the plate or sheet meet or may be spaced slightly apart leaving a narrow slot 49. The arrangement of tongues 50 on the upper side of the rectangular tube is different from the arrangement of the tongues 51 on the lower side. The ends of the tongues opposite from the connecting portions 52 are pointed or sharpened as indicated at 55.

In applying connector 46 to the overlapping end portions 53 and 54 of a strapping tape which has been placed around a package, or around a group of articles to restrain shifting during transportation, the two tapes are threaded through the connector in overlapping relation somewhat as shown in FIG. 11. The tapes are drawn tightly around the package or group of articles in any desired manner until the tapes are under the tension desired. Then a suitable multiple acting sealing tool (not shown) is applied first to one side of the connector 46 and then to its opposite side.

This tool is constructed and arranged to complete the punching out of the tongues and also to form cross-wise grooves 56 and 57 in the opposite side plates 47 and 48 respectively to receive the pointed ends of the tongues.

The tool also bends tongues 50 downwardly (FIGS. 12 and 13) at right angles to the sides of the connector. The inner or pointed ends of the tongues 50 are bent over as shown at 58 and engaged with the cross-wise groove 56. The tool is then applied to the opposite side of connector 46, and tongues 51 are similarly bent inwardly, and a second series of cross-wise grooves 57 is formed and the inner end portions 50 of these tongues are bent over and engaged with these grooves.

As shown in FIG. 12, the rear surfaces 60 of tongues 50 and 51 are dished or concave and their forward surfaces 61 are convex. This convexity together with the pointed formation of the tongues (before the end portions 58 and 59 are bent over) enables the tongues as they are swung downwardly to split the fibrous masses of the overlapping end portions 53 and 54 of tape 12. Inasmuch as there are at least two rows 64 (FIG. 11) of glass fiber yarns 16 in each central layer 14 these yarns being in staggered relation in cross-section as shown in FIGS. 2, 4 and 11, the tongues 50 and 51 always pierce and divide the yarns of at least one of the two rows.

The width of the tongues 50 and 51 being arranged laterally of the strapping, each tongue engages a considerable number of the filaments of the glass fiber yarns, such filaments being spread on the opposite sides of the tongues. Inasmuch as tongues 50 and 51 are supported at their opposite ends they are placed in shear by the oppositely directed forces of the two tape portions 53 and 54 and it is impossible for the tongues to be bent backwards towards their original positions by the tension forces existing in the two tapes. A sufficient number of tongues 50 and 51 are provided so that the tensile strength of the strapping material at the connectors 46 is comparable to the tensile strength of the tape employed in the strapping, such strength being determined in the manner above described.

I claim:

1. A composite strapping tape including in combination a central layer of reinforcing fibrous material having on one side thereof a layer of stretch oriented plastic material and on the opposite side thereof a layer of bi-axially oriented plastic material having a thickness of not over 50% of the thickness of the layer of stretch oriented plastic material, the reinforcing fibrous material comprising a plurality of string-like sinuous elements arranged side by side, the materials of the side layers extending through the interstices of the central layer and mutually adhering to one another to form a homogeneous mass in which the fibrous material is encapsulated in the plastic material.

2. A strapping tape as set forth in claim 1 in which the fibrous material is in the form of sinuous glass filaments.

3. A composite strapping tape as set forth in claim 1 wherein the layer on said opposite side is cast plastic material.

References Cited

UNITED STATES PATENTS

| | | | |
|---|---|---|---|
| 2,680,272 | 6/1954 | Radtke | 161—143 XR |
| 2,749,965 | 6/1956 | Manning | 161—402 XR |
| 2,858,090 | 10/1958 | Winzen et al. | 244—31 |
| 3,252,833 | 5/1966 | Skobel | 161—91 XR |
| 3,314,841 | 4/1967 | Romanin | 156—179 |

FOREIGN PATENTS 231,038  6/1959  Australia.

ROBERT F. BURNETT, Primary Examiner

WILLIAM A. POWELL, Assistant Examiner

U.S. Cl. X.R.

24—16, 265; 156—179, 253, 306, 436, 510; 161—60, 111, 112, 402